Oct. 25, 1955     E. E. PERRY     2,721,416
INSECTICIDE ATTACHMENT FOR TRACTORS
Filed May 7, 1951

E. E. PERRY
INVENTOR
BY *Herbert J. Brown*
ATTORNEY

United States Patent Office 2,721,416
Patented Oct. 25, 1955

2,721,416
INSECTICIDE ATTACHMENT FOR TRACTORS
Elijah E. Perry, Henderson, Tex.

Application May 7, 1951, Serial No. 224,997

3 Claims. (Cl. 43—141)

This invention relates to insect exterminators, and has reference to apparatus adapted to be mounted on a tractor.

An object of the invention is to provide an exterminator particularly suitable for eradicating boll weevils, their eggs and larva, and for use in spraying and killing other insects on row crops.

Another object of the invention is to provide an exterminator which not only sprays cotton plants, but one which agitates the plants, causing the sprayed insects, larva and eggs to fall into pans of insecticide carried by the exterminator.

A further object of the invention is to provide a vaporizer for exterminators of the described class which employs the exhaust of a tractor or the like for applying the insecticide to the plants as well.

The invention will be more readily understood by reference to the following description and the accompanying drawing, wherein.

Figure 1:
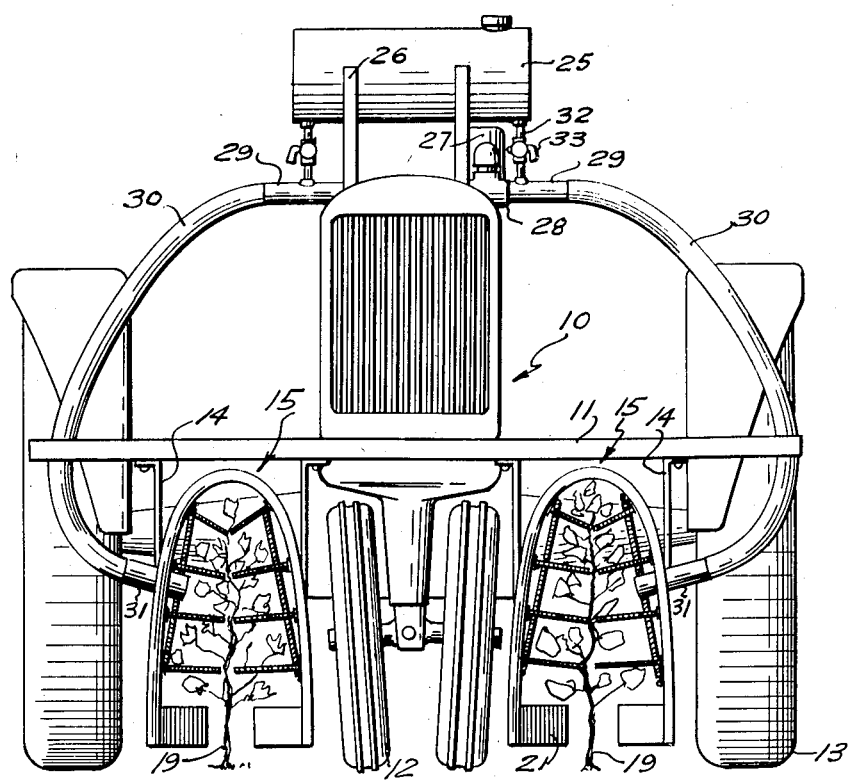
Figure 1 is a front elevation of a tractor showing the present invention mounted thereon.

In the drawings, the numeral 10 generally designates a tractor having a transverse tool bar 11 or the like mounted on the forward end thereof, together with closely set front and widely set rear wheels 12 and 13, respectively arranged in the usual manner. Pairs of depending brackets 14, mounted on opposite sides of the front wheels 12 and inwardly of the rear wheels 13, support shields 15 which have parallel sides 16 joined along their upper ends by means of arched connecting portions 17. The forward edges 18 are outwardly flanged so as not to tear the rows of cotton plants 19 which they straddle. Insecticidal holding pans 20 are secured to the lower inside surfaces of the parallel sides 16, and which pans are angularly formed, as at 21, on their forward ends so as to prevent uprooting the plants 19. The opposing inner surfaces of the shield sides 16 are provided with inwardly projecting coil springs 23 which serve to agitate or shake the plants. Additional springs 24 are secured on the respective shield sides 16 and arranged to support and stiffen the agitators 23.

An insecticide supply tank 25 is supported above the tractor 10 by means of brackets 26 and is arranged above the exhaust 27 of the tractor engine, not shown. A T connection 28 is connected with the exhaust 27 and is provided with extensions 29 in each end thereof for communicating separate flexible hoses 30 with discharge pipes 31 perpendicularly positioned through the outer sides 16 of the respective shields 15. Each extension 29 is connected with the bottom of the tank 25 by connecting lines 32 having petcocks 33 connected therein.

Figure 3:
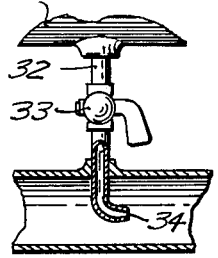
Figure 3 is a broken sectional view showing a preferred connection between the tank holding the liquid insecticide and one of the tractor exhaust extensions.
Figure 2:
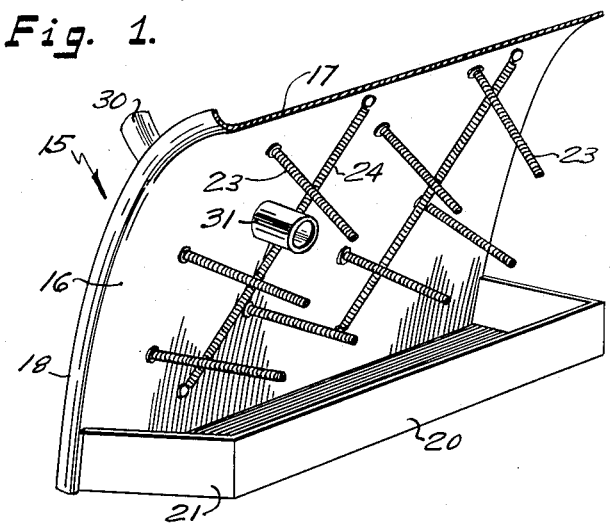
Figure 2 is a broken longitudinal perspective view of one of the shields employed in the invention, and showing a preferred arrangement of inwardly projecting coiled spring agitators mounted therein, together with one of the insect collecting pans positioned therebeneath.

As shown in Figure 3 the lower ends of the connecting lines are respectively turned, as at 34, in the direction of the flow of the exhaust gases so as to effectively atomize and vaporize the liquid insecticide entering said exhaust extension from said tank.

In operation, the shields 15 mounted on the tractor 10 are positioned in alignment with the rows of cotton plants 19 in the manner illustrated in Figure 1. The petcocks 33 are opened, or partially opened, to allow insecticide to flow from the tank 25 into the exhaust extension 29, where it is not only atomized as referred to in the foregoing, but is additionally vaporized by the hot exhaust gases. The resulting fog completely envelopes the individual plants 19, killing or paralyzing the boll weevils or other insects. The action of the agitators shakes the plants 19 and causes the dead or paralyzed boll weevils to fall in additional liquid insecticide carried in the pans 20. At the same time, the eggs and larva are shaken from the plants 19 and also fall in the pans 20. The agitating action also removes the faulty squares of the cotton plant.

It is to be understood that the invention is adaptable to all types of farm tractors, and that any number of shields 15, together with their associated described parts, or mechanical equivalent thereof may be used. To those versed in the art, it will be apparent that the shields 15 may be mounted either at the front, middle or back of the tractor 10, and that the hose connection 30 may be made with any engine exhaust 27. The invention is not limited to the specific construction herein shown and described but may be made in many ways within the scope of the appended claims.

What is claimed is:

1. In a shield of the type having a conduit associated therewith for receiving insecticide under pressure for spraying plants within the confines of the shield, a tray at the bottom of the shield, spring fingers extending inwardly from the walls of the shield and one or more springs secured to the shield wall adjacent the inner surface thereof and extending substantially from the upper end of the shield toward the portion of the wall adjacent the bottom of the shield and closely adjacent the spring fingers so as to urge them to their normal position when they are contacted by the plants.

2. In an insecticide attachment for tractors of the type having means for spraying insecticide under pressure on plants, a shield for confining the plants being sprayed, said shield being of an inverted U-shape and including depending side walls, spaced opposed trays secured to the inner surfaces of lower portions of said side walls, opposed spring fingers carried by said side walls and projecting inwardly therefrom, and at least one spring member secured to each side wall adjacent the inner surface thereof, said spring members extending from upper points on said side walls toward lower portions of said side walls adjacent said trays and being closely adjacent said spring fingers so as to urge them to a normal position when they are contacted by plants.

3. An exterminating device for use in exterminating insects on cotton plants, said exterminating device comprising an inverted shield, first means for spraying liquid insecticide into the confines of said shield for stunning and killing insects, second means carried within the confines of said shield for removing stunned and dead insects from plants passing through said shield, said shield being of an inverted U-shape and including depending side walls, spaced opposed trays secured to inner surfaces of lower portions of said side walls, opposed spring fingers carried by said side walls and projecting inwardly therefrom, and at least one spring member secured to each side wall adjacent the inner surface thereof, said spring members extending from upper points on said side walls towards portions of said side walls adjacent said trays and being closely adjacent said spring fingers so as to urge them to their normal position when they are contacted by plants.

References Cited in the file of this patent

UNITED STATES PATENTS

| | | |
|---|---|---|
| 876,612 | Watkins | Jan. 14, 1908 |
| 1,039,365 | Coulter | Sept. 24, 1912 |
| 1,465,557 | Oldham | Aug. 21, 1923 |
| 1,492,732 | Knopf | May 6, 1924 |
| 1,496,386 | Sligh | June 3, 1924 |
| 1,598,628 | Walker | Sept. 7, 1926 |
| 1,724,797 | Gibson | Aug. 13, 1929 |
| 1,930,588 | Dibble | Oct. 17, 1933 |
| 2,115,199 | Erlandson | Apr. 26, 1938 |
| 2,286,888 | Arnold | June 16, 1942 |
| 2,611,992 | Loy et al. | Sept. 30, 1952 |

FOREIGN PATENTS

| | | |
|---|---|---|
| 293,367 | Great Britain | June 28, 1928 |